3,168,374
PRODUCTION OF ZIRCONIUM COMPOUNDS FROM ALKALI METAL-ZIRCONIUM SILICATES
Eugen Meyer-Simon and Artur Frey, Frankfurt am Main, Germany, assignors to Deutsche Gold- und Silber-Scheideanstalt vormals Roessler, Frankfurt am Main, Germany
No Drawing. Filed Aug. 14, 1961, Ser. No. 131,103
Claims priority, application Germany, Sept. 3, 1960, D 34,163
6 Claims. (Cl. 23—117)

The present invention relates to an improved process for the production of zirconium salts and zirconium oxide from alkali metal-zirconium silicates with the aid of an acid, preferably, hydrochloric acid capable of decomposing such silicates to produce silicic acid and soluble zirconium compounds.

When this known reaction, for example, is carried out by introducing sodium- or potassium-zirconium silicates directly into 20–30% hydrochloric acid, spontaneous heating of the mixture to over 100° C. occurs and a thick mass which can no longer be stirred is produced. Complete decomposition of the silicate is not possible because of the occlusion of undecomposed material in such thick mass. Even when the process is reversed, that is, the hydrochloric acid is added to suspended silicate, the same difficulties occur. If attempts are made to operate with more dilute acid, a very soft silica gel is produced which is difficult to filter even upon addition of filter aids.

It is an object of the invention to provide a process for the acid decomposition of alkali metal zirconium silicates in which such decomposition is substantially complete and in which the silicic acid produced is more easily filtered.

It is a further object of the invention to provide a process for the production of basic zirconium sulfate of controlled grain size so that it can be of the size adapted to that desired for the end use of the zirconium oxide, ceramic pigments, catalysts or ceramic products produced therefrom.

According to the invention it was found that the acid decomposition of alkali metal-zirconium silicates can be substantially improved if the quantity of acid required for the conversion of the alkali metal content of the silicate is added slowly and the remainder of the acid required for the decomposition is added rapidly. The addition of the first portion of acid preferably is sufficiently slow that the temperature of the reaction mixture does not rise above 98—100° C.

The first step of the process according to the invention essentially effects an extraction of the alakili metal whereas the zirconium and silica content of the silicate are practically not attacked. The rapid addition of the remainder of the acid in the second step of the process causes formation of the zirconium salt, zirconium oxychloride, when the acid employed is hydrochloric acid, and the precipitation of silicic acid which solidifies after about 2 hours. The silicic acid is well separated and well adapted to filtration.

Basic zirconium sulfate can be precipitated from the filtrate by the addition of $SO_4^=$ ions. The $SO_4^=$ ions are added in a proportion of 0.5–0.6 $SO_4^=$/1 $ZrO_2$ and can be added, for example, as $(NH_4)_2SO_4$, $MgSO_4$, $Na_2SO_4$ and under some circumstances as $H_2SO_4$. The basic zirconium sulfate which precipitates is easily filtered and in view of the very acid meduim (pH <1.5) it is also free of iron, aluminum, alkaline earth metals and the like. When the reaction mixture is heated slowly and simultaneously stirred, a coarse grained basic zirconium sulfate is produced. When a fine grained sulfate is desired the reaction mixture must be heated as rapidly as possible to 100° C.

The following examples will serve to illustrate the process according to the invention.

*Example 1*

17.8 kg. of washed, moist sodium-zirconium silicate, such as, for example, produced according to U.S. Patent No. 3,027,230 containing 13.3 kg. of $Na_2O.ZrO_2.SiO_2$ (10 kg. of zirconium sand were required therefor) were suspended in 4 liters of warm water and the suspension quickly heated to 80–90° C. by the introduction of dry low pressure steam while stirring. Then 9 liters of hydrochloric acid (350 g. HCl/liter) were slowly added in a thin stream over a period of 1–2 hours while stirring. The temperature rose to 95° C. during such introduction and was maintained without introduction of further steam. The silicate material remained white and unswollen during such slow HCl addition.

Thereafter, a further 21 liters of such HCl were poured in as rapidly as possible. After such addition of the cold HCl, a temperature drop to about 80° C. occurred but a temperature of 90–95° C. was again attained after only about 2 minutes. Simultaneously a yellow coloration of the suspension occurred and the previously completely opaque mass became glassier without however becoming clear. The mixture was stirred for a further 30 minutes to ensure thorough intermixture. No substantial solidification occurred during such stirring. Such solidification only occurred during the next 2 hours. During subsequent ripening the silicic acid became water insoluble. Further heating was not necessary therefor. The mixture was then stored cold and crystallization of zirconium oxychloride occurred which effected a favorable dehydration of the silicic acid. Thereafter the reaction mixture was suspended in 20 liters of warm water. The resulting fairly thick slurry was diluted with an additional 15 liters of warm water and the mixture stirred in order that the zirconium oxychloride be well dissolved out of the silicic acid which had only been partially broken down to the size of coarse sand. The mixture was then filtered on a filter press. About 50 liters of filtrate were obtained. The filter cake was slowly washed with water. The yield of zirconium oxychloride was 98% of the theoretical.

The quantity of HCl added in the second step provided an excess of acid but this could be reduced.

Fine or coarse grained basic zirconium sulfate can be produced from the zirconium oxychloride solution by varying the precipitating conditions and as a consequence fine or coarse grained zirconium oxide can be obtained upon calcination of the precipitated basic zirconium sulfate.

Fine grained basic zirconium sulfate is obtained by heating the solution to which the sulfate ion donor has been added as rapidly as possible to 95–100° C.

Coarse grained basic zirconium sulfate is obtained by slowly heating the solution to 40–50° C., preferably 45° C., by direct introduction of steam until a clouding of the solution to be hydrolysed is effected. The heating up period requires about 1 hour. Thereafter the mixture is stirred without introduction of further steam until the clouding intensifies. Then a stronger stream of steam is introduced and the temperature raised to 95 to 100° C. in about 2 hours. This temperature is maintained for about 2 hours.

The basic zirconium sulfate formed settles very rapidly. In contrast to the finely divided basic sulfate produced by the rapid heating, a fairly compact sediment is obtained after the settling. However, such sediment is easily resuspended by stirring for purposes of filtration. The resulting coarse grained basic sulfate is still more easily filtered than the fine grained basic sulfate obtained on rapid heating. If it is thoroughly washed out an easily broken down $ZrO_2$ is obtained upon calcination which therefore does not need to be ground.

*Example 2*

1000 g. of sodium-zirconium silicate were suspended in 1280 cc. of water and heated to 85° C. in a water bath and 500 cc. of concentrated $HNO_3$ added dropwise over a period of 65 minutes while stirring. Thereafter 700 cc. of concentrated $HNO_3$ were added rapidly and the mixture then stirred to ensure thorough intermixture and allowed to ripen over night. During the first addition of the nitric acid the temperature did not rise above 85° C. It dropped to 81° C. upon addition of the second addition of $HNO_3$ but rose to 106° C. with some foam formation 2 minutes after such addition.

The reaction mixture after ripening was thick and pasty and was filtered after being slurried with water.

We claim:

1. In a process for the recovery of zirconium values by reaction of an alkali metal-zirconium silicate with a concentrated acid which decomposes such silicate to form silicic acid and a soluble zirconium compound, the steps which comprise adding the quantity of acid required for reaction with the alkali metal component of the silicate to an aqueous suspension of such alkali metal-zirconium silicate over a period of about 1 to 2 hours and at a rate sufficiently slow that the temperature of the reaction mixture does not rise above 100° C., then rapidly adding the remaining acid necessary to react with the zirconium component of the silicate and after the silicic acid formed has become water insoluble separating off such silicic acid to leave an aqueous solution of zirconium values.

2. The process of claim 1 in which said acid is 20–35% HCl and an $SO_4^=$ ion forming compound is added to the aqueous solution of zirconium values to precipitate basic zirconium sulfate.

3. The process of claim 2 in which the solution to which the $SO_4^=$ ion forming compound has been added is heated slowly to a temperature of 40–50° C. and maintained at such temperature until after precipitation has initiated and intensified and then slowly heating the mixture to 95–100° C. and maintaining such temperature until precipitation is completed to obtain a coarse grained basic zirconium sulfate precipitate.

4. The proces of claim 2 in which the solution to which the $SO_4^=$ ion forming compound has been added is heated as rapidly as possible to 100° C. to obtain a fine grained basic zirconium sulfate precipitate.

5. The process of claim 1 in which said acid is 20–35% HCl.

6. The process of claim 5 in which said aqueous suspension of alkali metal-zirconium silicate is heated to 80–90° C. before addition of the acid.

References Cited by the Examiner

UNITED STATES PATENTS

| | | | |
|---|---|---|---|
| 1,681,195 | 8/28 | Rusberg et al. | 23—16 |
| 1,796,170 | 3/31 | Terwilliger | 23—19 |
| 2,294,431 | 9/42 | Wainer | 23—23 |

FOREIGN PATENTS

| | | | |
|---|---|---|---|
| 135,623 | 12/49 | Australia. | |

MAURICE A. BRINDISI, *Primary Examiner.*